(12) United States Patent
Mapp (10) Patent No.: US 11,914,550 B1
(45) Date of Patent: Feb. 27, 2024

(54) SELF-HEALING SERVER FILE SYSTEM WITH SPACE CLEANUP

(71) Applicant: Truist Bank, Charlotte, NC (US)

(72) Inventor: Lauren Mapp, Atlanta, GA (US)

(73) Assignee: Truist Bank, Charlotte, NC (US)

( * ) Notice: Subject to any disclaimer, the term of this patent is extended or adjusted under 35 U.S.C. 154(b) by 0 days.

(21) Appl. No.: 18/061,165

(22) Filed: Dec. 2, 2022

(51) Int. Cl.
   *G06F 16/16* (2019.01)
   *G06F 11/34* (2006.01)
   *G06F 16/17* (2019.01)

(52) U.S. Cl.
   CPC ........ *G06F 16/162* (2019.01); *G06F 11/3442* (2013.01); *G06F 16/1727* (2019.01)

(58) Field of Classification Search
   CPC .......... G06N 20/00; G06N 5/022; G06N 5/02; G06F 16/113; G06F 3/0649; G06F 11/1446; G06F 16/185; G06F 16/11; G06F 11/079; G06F 30/27; G06F 11/0793
   See application file for complete search history.

(56) References Cited

U.S. PATENT DOCUMENTS

| | | | | |
|---|---|---|---|---|
| 2018/0300199 A1* | 10/2018 | Rathbone | ............ | G06F 11/1662 |
| 2021/0042180 A1* | 2/2021 | Sutton | .................. | G06F 11/0727 |
| 2022/0091763 A1* | 3/2022 | Perneti | .................. | G06F 3/0653 |
| 2023/0039566 A1* | 2/2023 | Ghag | .................. | G06F 11/0736 |
| 2023/0259419 A1* | 8/2023 | Seck | .................. | G06Q 10/0639 |
| | | | | 714/26 |

* cited by examiner

*Primary Examiner* — Hau H Hoang
(74) *Attorney, Agent, or Firm* — Kilpatrick Townsend & Stockton LLP; Michael A. Springs, Esq.

(57) ABSTRACT

A system can include instructions for generating a machine-learning model, including accessing, from a memory device, training data including two or more first commands. The first commands can be manually generated in response to a utilization exceeding a preset threshold and two or more first conditions, including a date and time the utilization exceeded the preset threshold. The training data can also include second commands generated by the machine-learning model in response to the utilization exceeding the preset threshold. The system may train the machine-learning model using a machine-learning algorithm using the training data and the second commands. The system may receive an indication of a utilization exceeding a preset threshold and determine, using the machine-learning model, an action responsive to the utilization. A command can be outputted to execute the action responsive to the utilization.

20 Claims, 3 Drawing Sheets

SELF-HEALING SERVER FILE SYSTEM WITH SPACE CLEANUP

TECHNICAL FIELD

The present disclosure relates generally to computing resources and, more particularly (although not necessarily exclusively), to managing computing resources using artificial intelligence and machine-learning tools for providing self-healing server systems in a computing system.

BACKGROUND

Computing resources may be depleted during operations. For example, a server hosting a database may be low on memory space for storing data or processing power for speed to execute computing functions. In some cases, lack of memory space or sufficient processing power or speed may result in application failures or loss of data. Server engineers may detect the low resource issue through routine monitoring and subsequently correct the condition by manually deleting unneeded data until the low resource issue is corrected. Manually detecting and deleting data, particularly when very large amounts of data are involved, can be a time-consuming, error-prone process and may not detect issues in sufficient time to correct the issues prior to causing negative network performance.

SUMMARY

In one example, a computer-implemented method includes receiving an indication of a utilization exceeding a preset threshold; responsive to the indication of the utilization, outputting instructions to create an incident; determining, using a machine-learning model, an action responsive to the utilization; outputting a first command to execute the action responsive to the utilization; determining that the utilization no longer exceeds the preset threshold; and outputting a second command to close the incident.

In another example, a system includes a processing device; and a memory device that includes instructions executable by the processing device for causing the processing device to perform operations including: generate a machine-learning model, including: accessing, from a memory device, training data including: two or more first commands, the first two or more commands manually generated in response to a utilization exceeding a preset threshold; and two or more first conditions, including a date the utilization exceeded the preset threshold and a time the utilization exceeded the preset threshold; receiving two or more second commands, the two or more second commands generated by the machine-learning model in response to the utilization exceeding the preset threshold; and training the machine-learning model using a machine-learning algorithm using: the training data; and the two or more second commands; receive an indication of a utilization exceeding a preset threshold; determine, using the machine-learning model, an action responsive to the utilization; and output a command to execute the action responsive to the utilization.

In another example, a non-transitory computer-readable medium includes instructions that are executable by a processing device for causing the processing device to perform operations including: generate a machine-learning model, including: accessing, from a memory device, training data including: two or more first commands, the two or more first commands manually generated in response to a utilization exceeding a preset threshold; and two or more first conditions, including a date the utilization exceeded the preset threshold and a time the utilization exceeded the preset threshold; receiving two or more second commands, the two or more second commands generated by the machine-learning model in response to the utilization exceeding the preset threshold; and training the machine-learning model using a machine-learning algorithm using: the training data; and the two or more second commands; receive an indication of a utilization exceeding a preset threshold; determine, using the machine-learning model, an action responsive to the utilization; and output a command to execute the action responsive to the utilization.

DETAILED DESCRIPTION

Certain aspects and examples of the present disclosure relate to automatically correcting computing resource overutilization using self-healing techniques utilizing artificial intelligence and machine-learning tools. Computing resources may include any component of a computing system that may be consumed by applications running on the computing system. Computing resources may include, for example, hard disk space, available random access memory (RAM), virtual disk space, processors, video memory, among others. In some examples, computing resources are allocated to applications running on a computing system. Overutilization may occur if allocated computer resources are nearly or fully consumed, resulting in application failures or other software problems. Self-healing techniques may include artificial intelligence technologies and machine-learning tools including algorithms that can detect patterns and classify information based on patterns learned from similar information.

One scenario while operating distributed computing systems may include application failures due to overconsuming computing resources. For example, an application that relies on a database component may fail if the server hosting the database runs out of disk space. In another example, a server may become impracticably slow in the event processing resources are fully consumed by applications running on the server. In some cases, server engineers may need to manually intervene to correct these failures. For example, if a low disk space condition leads to an application failure, an organization may generate a high priority incident, alerting administrators to the problem. A server engineer may manually identify unneeded data and delete the unneeded data to correct the low disk space condition. In some examples, a server engineer may use pre-prepared scripts to correct the low disk space condition. For example, a server with low disk space may contain pre-identified temporary files like cached web browsing data that can be deleted using a pre-prepared script in the event a low disk space condition occurs. But, execution of such scripts again requires manual intervention by server engineers. Manually correcting resource overconsumption is time-consuming and error prone.

To address the issues associated with interventions, systems and methods for managing computing resources using artificial intelligence and machine-learning tools are provided. Artificial intelligence and machine-learning tools may add to computer programs the capability to improve with respect to some class of tasks by learning according to a machine-learning algorithm. In an example, a computing system may receive an indication that utilization of a computing resource has exceeded some preset threshold. In other words, an overutilization condition may exist. For example, some computing systems may make use of automated monitoring systems. Such monitoring systems may alert server engineers that a designated threshold has been exceeded. For example, the monitoring system may detect that disk space consumption on a server has exceeded 90%. The computing system may then determine, using a machine-learning model, an action that is responsive to the low disk space condition. For example, the action may include executing one or more scripts to remove data or files to reduce disk space consumption below the threshold. The machine-learning model may provide configurations to the scripts that correspond to the particular low disk space condition encountered. In another example, the machine-learning model may identify data and files that can be deleted or moved to reduce disk space consumption. The computing system may then, in accordance with the action determined by the machine-learning model, output one or more commands to execute the action. For example, the computing system may output commands to execute the scripts according to the configuration determined by the machine-learning model. In another example, the computing system may output commands to delete or move the files or data identified by the machine-learning model.

In some examples, the machine-learning model may be trained using training data or using feedback from operating the computing system. The training data may include data that reflects manual actions taken in response to overutilizing computing resources from historical data. For example, in some examples, manual actions taken in response to low disk space conditions may be enumerated in an archive. The archive may be a ticketing system or other similar mechanism used in network administration. The training data may include the commands executed in response to particular conditions, as described in the archive. For example, the archive may include a narrative describing a low disk space condition that occurred sometime in the past. The archive may include a detailed description of the specific actions taken by a server engineer in response to the condition. For example, the archive may list specific commands that were executed or scripts that were executed. The training data may also include additional information about the overutilization conditions. For example, in addition to actions taken in response to the low disk space condition of the previous example, the training data may include the date and time that the low disk space condition occurred or the applications that were concurrently running when the low disk space condition occurred.

The feedback from operating the computing system can include training the machine-learning model using the output of the model as continuous feedback. For example, the machine-learning model may identify data and files that can be deleted or moved to reduce disk space consumption on a particular day and time. The particular data and files identified at a particular time and date, along with the outcome of those actions, may be fed back to the machine-learning model as training data. For example, the machine-learning model may identify files for deletion that ultimately fail to correct the overutilization condition, which may then be used to train a machine-learning model using a reinforcement algorithm.

In some examples, upon receiving the indication that utilization of a computing resource has exceeded some preset threshold, the computing system may output instructions to create an incident. The incident may have a severity level corresponding to the extent to which the preset threshold was exceeded. The incident may alert server engineers that a resource overutilization condition exists and that some corrective action is to be taken. The machine-learning model may determine suitable corrective actions and the computing system may output commands to restore the overutilization condition below the preset threshold. In this example, the computing system may then determine that the utilization no longer exceeds the preset threshold and output a second command to close the incident.

In some examples, the machine-learning model may determine a forecasted utilization condition. For example, the machine-learning model may determine, based on the training data or continuous feedback, that a low disk space condition is likely to occur on a particular day at a particular time. As before, the machine-learning model may then determine an action responsive to the forecasted low disk space condition and output a command according to the action to prevent the low disk space condition from occurring. In this way, the benefits of the corrective actions determined by the machine-learning model may be obtained without the preset threshold being exceeded or an incident being generated. In effect, the machine-learning model can be used for prevention rather than reaction.

In some examples, the machine-learning model determines an action responsive to a utilization condition by first determining one or more candidates for modification. For example, in the context of a low disk space condition the machine-learning model may identify files or data as candidates for deleting or moving, according to the training data. For example, the candidates may be the files in a particular directory or the entries in a table older than a particular date. The machine-learning model may use a clustering algorithm to group files according to particular features. For example, a clustering algorithm may be used by the machine-learning model to group files according to type, retention duration, date added, size, or other properties. As part of implementing the clustering algorithm, the machine-learning model may use a similarity measure for the candidates. The machine-learning model may then determine a modification for each candidate. For example, the model may determine that some candidates may be deleted. The machine-learning model may then, according to the clustering algorithm and the similarity measure, identify candidates for modification by identifying clusters with the desired properties. For example, using a clustering algorithm, the machine-learning model may determine that clustered candidates that are image files older than one month are to be deleted.

In some examples, the utilization condition may correspond to a low disk space condition. The machine-learning model may determine that one or more files is to be moved or deleted to correct the low disk space condition. The files may be moved to a cache server, rather than permanently deleted. The files in the cache server may be annotated with a timestamp to indicate how long the files have been cached. The timestamp can allow the computing system to determine when files may be permanently deleted according to, for example, a retention policy. The files may be further annotated with a reason, which may be data or a message explaining why the particular file was selected for deletion. The reason may allow server engineers to audit the actions of the machine-learning model in the event of inadvertent file or data loss. The computing system may determine that the timestamp of one or more cached files has exceeded the cache lifetime according to, for example, a retention policy, and permanently delete the one or more cached files.

In some examples, the utilization condition may correspond to a particular application. The machine-learning model may determine actions responsive to utilization conditions based on training data associated with the particular application. For example, the utilization condition may correspond to a low disk space condition. A first application may be associated with the accumulation of large numbers of image files, while a second application may be associated with accumulating a large amount of data in a database. The machine-learning model may determine actions responsive to the low disk space in accordance with training data associated specifically with the first application and the second application. For example, the training data may reflect a corrective response for the first application including deleting the image files. The training data may reflect a corrective response for the second application including truncating one or more tables in the database. The computing system may then output commands corresponding to the actions determined by the machine-learning model for each application. In another example, the first application and the second application may have different retention policies, which may influence the action determined by the machine-learning model or the length of time the moved or deleted data remains cached.

In some examples, the utilization condition may correspond to shared processor resources, shared memory, Java virtual machine runtime parameters, database runtime parameters, or any other parameters that may be programmatically adjusted. For example, the computing system may determine that a central processing unit (CPU) overutilization condition has occurred. The machine-learning model may determine a reallocation of the shared processor resources according to the training data. The computing system may then reallocate the shared processor resources according to the reallocation determined by the machine-learning model. The computing system may then output messages to programs utilizing the shared processor resources to cause the programs to utilize the reallocated processor resources. For example, some programs may be restarted to utilize the shared processor resources.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
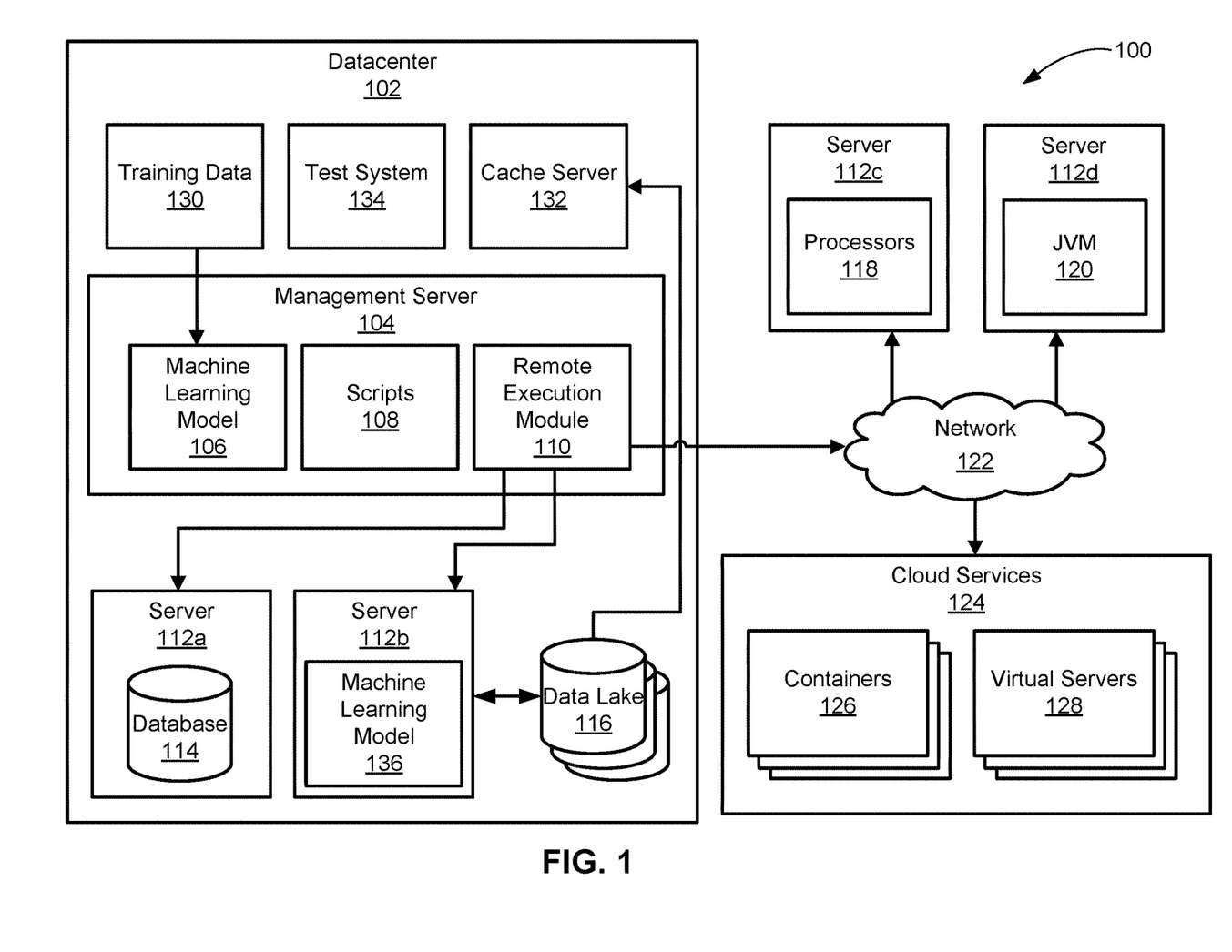
FIG. 1 is a schematic of an example of a system for managing computing resources using artificial intelligence and machine-learning tools, according to one aspect of the present disclosure.

FIG. 1 is a schematic of an example of a system 100 for managing computing resources using artificial intelligence and machine-learning tools, according to one aspect of the present disclosure. The system 100 may include a management server 104 running inside a datacenter 102. But the management server 104 may be external to the datacenter 102, for example, in a cloud computing instance. The datacenter 102 may include physical servers, virtual server instances, gateways to cloud computing instances, or any combination thereof.

The management server 104 may include a machine-learning model 106. But the arrangement of the machine-learning model 106 component within the management server 104, like the components of the management server 104, is illustrative. These components may be located in other servers, other datacenters, in cloud computing instances, virtual servers, or some combination thereof.

The machine-learning model 106 may determine an action responsive to a utilization condition. For example, in a low disk space overutilization scenario, the machine-learning model 106 may determine one or more files or data to delete or move to correct the low disk space condition. The machine-learning model 106 may be trained using training data 130. The training data 130 may include historical data related to correcting utilization conditions. The training data 130 may be accessed by the machine-learning model 106 from a memory device. The training data 130 may include commands manually generated in response to a utilization exceeding some threshold contained in an archive. For example, a low disk space condition may have occurred. In response, a server engineer may have created documentation, a message, a ticket, or similar mechanism for documenting the low disk space condition. The server engineer may have corrected the low disk space condition through manually deleting one or more files or data from the system 100. The server engineer may have documented the response on the ticket or other archival format. For example, the server engineer may have run one or more commands, and added those commands to the ticket. The ticket may include the outcome of running the one or more commands. In other examples, the ticket or documentation may include specified scripts 108 for execution. For example, the ticket may specify that running the one or more commands reduced disk space utilization below a preset threshold. The ticket, or other historical or archival data, may comprise the training data 130. The training data 130 may provide labeled examples for supervised training of the machine-learning model 106.

The machine-learning model 106 may be trained using feedback from operating the system 100 (i.e., online training). In this example, the machine-learning model 106 can further refine itself. In other words, the feedback can provide supervised training for the machine-learning model 106. For example, the machine-learning model 106 may determine an action to correct a low disk space condition. The action may include deleting one or more files. The system 100 may output commands in accordance with the action determined by the machine-learning model 106. Executing the commands may reduce disk space utilization by a particular amount. The action and subsequent reduction can provide labeled examples for supervised training of the machine-learning model 106.

The machine-learning model 106 may be trained using a test system 134. The test system 134 may mirror the system 100 in some respects. For example, the test system 134 may include filesystems or databases that are populated according to populating the corresponding components in the system 100. The test system 134 may include a portion of the operations performed on the system 100. For example, a designated percentage of files written to the filesystems and database of the system 100 may be written to the test system, to make the test system 134 cost effective. The machine-learning model 106 may determine actions to correct utilization conditions on the test system 134, which may then execute commands to perform the actions. The machine-learning model 106 can use the result of executing the commands as labeled examples for supervised training. The test system 134 may include the benefit of lower risk since the actions take on the test system 134 may not affect the system 100.

The machine-learning model 106 may include a clustering algorithm. The clustering algorithm may be used to group files and data according to criteria that may correspond to candidacy for deletion. The clustering algorithm may include a similarity measure to group related files and data into candidate clusters according to a property or properties. For example, image files older than one month that are generated by a particular type of application may be clustered using a similarity measure that includes those properties. The similarity measure can be configured using hyperparameters to increase the threshold for clustering. In other words, hyperparameters can be used to require heightened similarity for files to be clustered together. Choice of hyperparameters may limit the possibility of inadvertently deleting files according to the output of the clustering algorithm. The clustering algorithm may include a manual or unsupervised similarity measure. The clustering algorithm may be used to identify clusters for deleting and clusters for retaining, as well as for outlier detection. For example, the machine-learning model 106 may be configured to exclude outliers from deletion.

This description of a machine-learning model 106 implementation is non-limiting. The machine-learning model 106 may include other algorithms. For example, the machine-learning model 106 may include naïve classifiers, neural networks, linear regressions, support vector machines, decision trees, or other suitable algorithms. The machine-learning model 106 may include other forms of artificial intelligence technologies including deep learning, natural language processing, expert systems, inference engines, or knowledge bases, among others.

The management server 104 may include one or more scripts 108. Alternatively, the scripts 108 may be accessed from a memory device, cloud storage location, or other suitable location. The scripts 108 may be used to correct utilization conditions. For example, the scripts 108 may be executed to correct a low disk space condition. In some examples, the machine-learning model 106 may determine the appropriate scripts 108 to execute to correct the utilization condition. In other examples, the machine-learning model 106 may determine actions including specific commands, and not utilize the scripts 108, or a combination thereof. The scripts 108 may include one or more commands. The scripts 108 may be configured by the machine-learning model 106 to execute according to the indication of a utilization exceeding a preset threshold, or the scripts 108 may be run with pre-determined configurations. The scripts 108 may be authored in any suitable scripting language, including bash, sh, zsh, bat, PowerShell or programming language, such as Python, Ruby, C, C++, or Java.

The management server 104 may include a remote execution module 110. The remote execution module 110 receives the commands output by the system 100 following determining the machine-learning model 106 of an action responsive to the utilization condition. The remote execution module 110 then executes the commands on a designated server 112 or other network location. The remote execution module 110 may include a Secure Shell client, PowerShell remote sessions, remote desktop client, remote procedure call implementation, or other suitable software for executing commands on a remote server. In some examples, the machine-learning model 106 is located on the server 112 with the utilization condition, in which case the remote execution module 110 may not be needed since the commands may be executed locally on the server 112.

The system 100 may include a server 112a in the datacenter 102. The server 112a may include a database 114. In some examples, the database 114 may be in a separate server inside the datacenter 102 or in a remote network location, like a cloud storage provider. The datacenter 102 may include a server 112b that includes the machine-learning model 136. In that example, the remote execution module 110 may not be used since the machine-learning model 136 can determine actions to be executed locally. The server 112b may be communicatively coupled with a data lake 116. The data lake 116 may store files or data in a raw, unstructured format for use in analytics, modeling, among other applications. The data lake 116 may become extremely large, such as greater than hundreds of petabytes of data. Managing resource consumption by the data lake 116, particularly disk space, may be a useful feature of the system 100. The machine-learning model 136 running on server 112b may determine an action to correct a low disk space condition on the data lake 116. In some examples, the machine-learning model 136 may forecast a low disk space condition on the data lake 116 and determine an action to prevent the low disk space condition from occurring.

The system 100 may include a cache server 132. In some examples, when the system 100 is responding to a low disk space condition by deleting or moving files, the files may first be moved to the cache server 132. The files on the cache server 132 may be annotated with a timestamp. The timestamp may be used to determine whether the files can be permanently deleted according to a retention policy. The retention policy may vary according to the source of the files. For example, a web application may generate temporary files with a retention policy of one week, whereas a payment processing application may generate data with a regulatory retention requirement of one year. The timestamp may be compared with the retention policy, according to the source of the files, and be permanently deleted once the timestamp exceeds the associated retention policy. In some examples, the files on the cache server 132 may be annotated with a reason. The reason may be used for auditing purposes. The reason may be generated by the machine-learning model 106 according to determining an action to correct a low disk space condition. The reason may be used for server engineers to determine why for removing or deleting a particular file in case the particular file was inadvertently or erroneously moved or deleted. The reason may also be used as a source of training data 130 for online or feedback training of the machine-learning model 106. For example, the reason may enumerate the set of property or properties determined by a clustering algorithm comprising the machine-learning model 106 that led to including the candidate file in the determination by the machine-learning model 106 of an action to correct the utilization condition. This is an example of a form for the reason and other forms are possible. For example, the reason may be human-readable or machine-readable. In some examples, the reason may be output to server engineers prior to moving or deleting files or data. In the case of sensitive data, manual approval may be used prior to moving data to the cache server 132.

The system 100 may include servers 112c, 112d located outside the datacenter 102 that are accessible using one or more networks 122. The one or more networks 122 may include a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

The system 100 may include a server 112c with shared processor resources 118. In some examples, the utilization condition can include overutilizing CPU resources. For example, the system 100 may receive an indication that the server 112c is utilizing 95% of shared processor resources 118. In some examples, the machine-learning model 106 may determine an action responsive to the CPU overutilization. For example, the machine-learning model 106 may determine a reallocation of shared processor resources 118. The system 100 may then output commands to cause a reallocating of shared processor resources 118 to correct the CPU overutilization condition. The system 100 may send reallocation messages to consumers of the shared processor resources 118. For example, consumers such as programs utilizing shared processor resources may need to restart or be reconfigured to utilize the reallocated shared processor resources 118.

The system 100 may include a server 112d that includes a Java Virtual Machine (JVM) 120. The JVM 120 may have a configuration that specifies, among other things, a particular memory utilization. For example, the configuration of the JVM 120 may specify a heap size. The heap may include dynamically allocated memory. In some examples, the utilization condition can include overutilization of heap memory. For example, the system 100 may receive an indication that the JVM 120 is low on heap memory space. In some examples, the machine-learning model 106 may determine an action responsive to the heap overutilization. For example, the machine-learning model 106 may determine a reallocation of shared memory. The system 100 may then output commands to cause a reallocating of shared memory to correct the heap overutilization condition. For example, the JVM 120 may have configuration variables updated to specify a larger heap size. The system 100 may send reallocation messages to consumers of the reallocated shared memory of the JVM 120. For example, consumers such as programs utilizing the JVM 120 and JVM shared memory may need to restart or be reconfigured to utilize the reallocated heap size.

Other software may experience utilization conditions that can be detected by the system 100 or forecasted by the machine-learning model 106, which may then determine a suitable corrective action. For example, the machine-learning model 106 may determine corrective actions for utilization conditions associated with databases, runtime engines, or operating systems, among others.

The system 100 may include one or more cloud services 124. For example, the server 112 may be implemented by one or more containers 126 running in a cloud compute instance. The containers 126 may also be included in a server 112, alongside other components discussed above. For example, a server 112a may host a database 114 and the containers 126, supplying additional functions including acting as an additional server. The containers 126 may also be included in the datacenter 102 as part of, for example, a container orchestration server. Likewise, the cloud services 124 may include one or more virtual servers 128. The virtual servers 128 may also reside in the datacenter 102 or on a server 112, as part of, for example, a virtualization technology like a hypervisor. Both the containers 126 and virtual servers 128 may experience utilization conditions that can be detected by the system 100 or forecasted by the machine-learning model 106, which may then determine a suitable corrective action.

Although certain components are shown in FIG. 1, other suitable, compatible, network hardware components and network architecture designs may be implemented in various examples to support communication between the management server 104 and the servers 112. Such communication network(s) may be any type of network that can support data communications using any of a variety of commercially-available protocols, including, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network(s) connecting the management server 104 and server 112a in FIG. 1 may be local area networks (LANs), such as one based on Ethernet, Token-Ring or the like. Such network(s) also may be wide-area networks, such as the Internet, or may include financial/banking networks, telecommunication networks such as a public switched telephone networks (PSTNs), cellular or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

Figure 2:
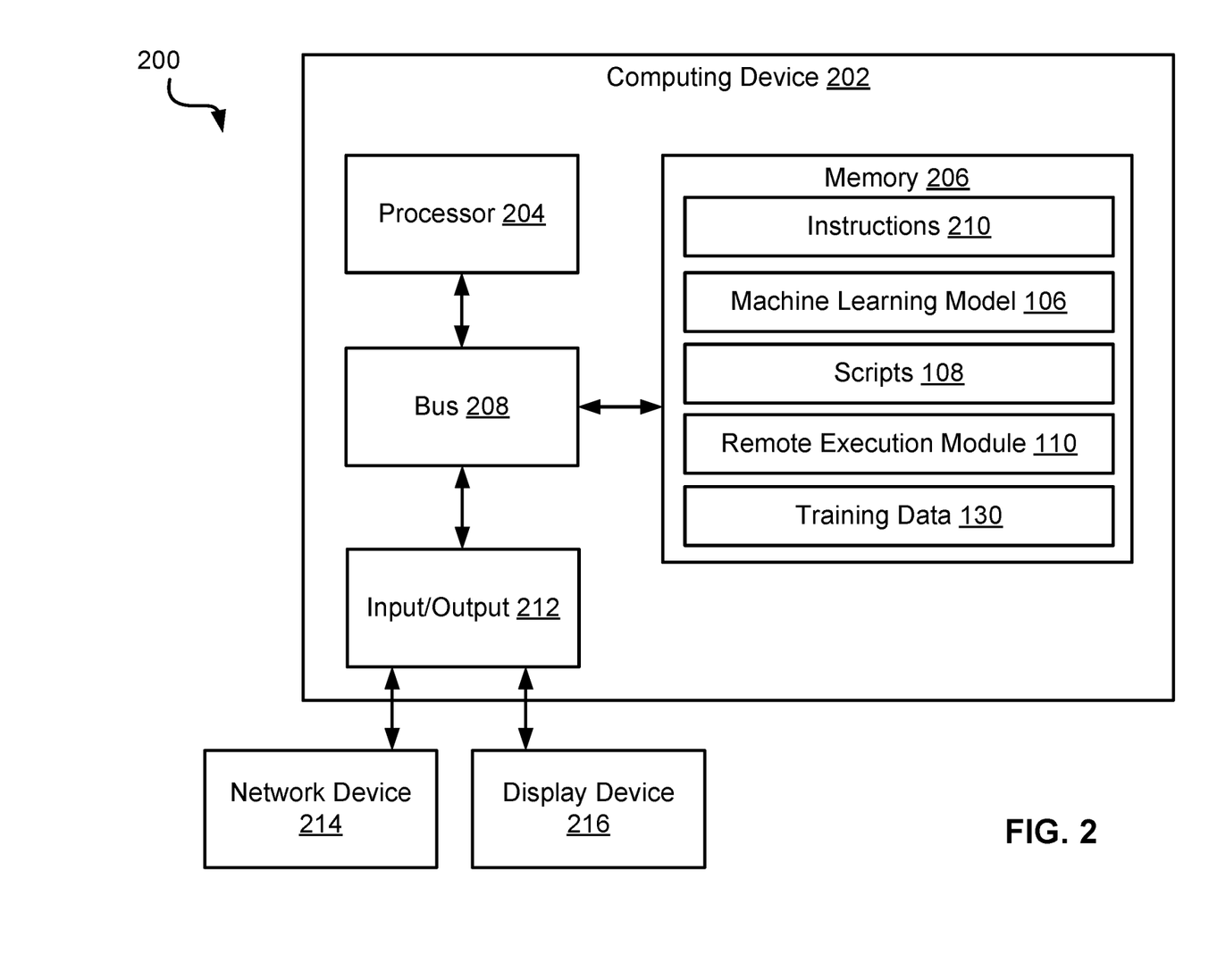
FIG. 2 is a block diagram of an example of a system for managing computing resources using artificial intelligence and machine-learning tools according to one aspect of the present disclosure.

FIG. 2 is a block diagram of an example of a system 200 for managing computing resources using artificial intelligence and machine-learning tools according to one aspect of the present disclosure. The system 200 may correspond to the management server 104, one of the servers 112, a container 126, a virtual server 128, or any other component included in the system 100. A computing device 202 can include a processing device 204, a memory 206, a bus 208, and an input/output 212. A display device 216 and network device 214 can be connected to the input/output 212. In some examples, the components shown in FIG. 2 may be integrated into a single structure. For example, the components can be within a single housing. In other examples, the components shown in FIG. 2 can be distributed (e.g., in separate housings) and in electrical communication with each other.

The processing device 204 may execute one or more operations for implementing various examples described herein. The processing device 204 can execute instructions 210 stored in the memory 206 to perform the operations. The processing device 204 can include one processing device or multiple processing devices. Non-limiting examples of the processing device 204 include a Field-Programmable Gate Array ("FPGA"), an application-specific integrated circuit ("ASIC"), a microprocessor, etc.

The processing device 204 may be communicatively coupled to the memory 206 via the bus 208. The memory 206 may include any type of memory device that retains stored information when powered off. Non-limiting examples of the memory 206 include electrically erasable and programmable read-only memory ("EEPROM"), flash memory, or any other type of non-volatile memory. In some examples, at least some of the memory 206 may include a medium from which the processing device 204 can read instructions 210. A computer-readable medium may include electronic, optical, magnetic, or other storage devices capable of providing the processing device 204 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor may read instructions 210. The instructions 210 may include processor-specific instructions generated by a compiler or an interpreter from code written in any suitable computer-programming language, including, for example, C, C++, C#, etc.

The input/output 212 may interface other network devices or network-capable devices to communicatively couple, For example, a server 112 to the remote execution module 110. Information received from the input/output may be sent to the memory 206 via the bus 208. The memory 206 can store any information received from the input/output 212.

The memory 206 may include instructions 210 for operating the machine-learning model 106. The machine-learning model 106 may, responsive to an indication of a utilization condition, determine an action that may be taken by the system 100 to correct the utilization condition. The memory 206 may contain one or more scripts 108 that may be executed by the system 100, in response to determining an action by the machine-learning model 106. The scripts 108 may be configured according to the determination of the machine-learning model 106. The machine-learning model 106 may be trained using training data 130 that reflects manual invoking of the scripts 108, including configuring the scripts 108. The memory 206 may contain a remote execution module 110 that may be used to execute the commands constituting the action determined by the machine-learning model 106 in response to a utilization condition. The memory 206 may also contain training data 130 that is accessed by the system 100 to generate and train the machine-learning model 106. The training data 130 may include historical data corresponding to manual actions taken to correct utilization conditions. The training data 130 may be used to train the machine-learning model 106 using both supervised and unsupervised training. For example, the training data 130 may include labeled examples that may be used for supervised training of a neural network to classify a particular utilization condition. In another example, the training data 130 may be used as input to a clustering algorithm as part of unsupervised training of a clustering model. The clustering model may be used, according to a similarity measure, to identify groups, or clusters, of utilizations that may be the subject of actions determined by the machine-learning model 106.

Figure 3:
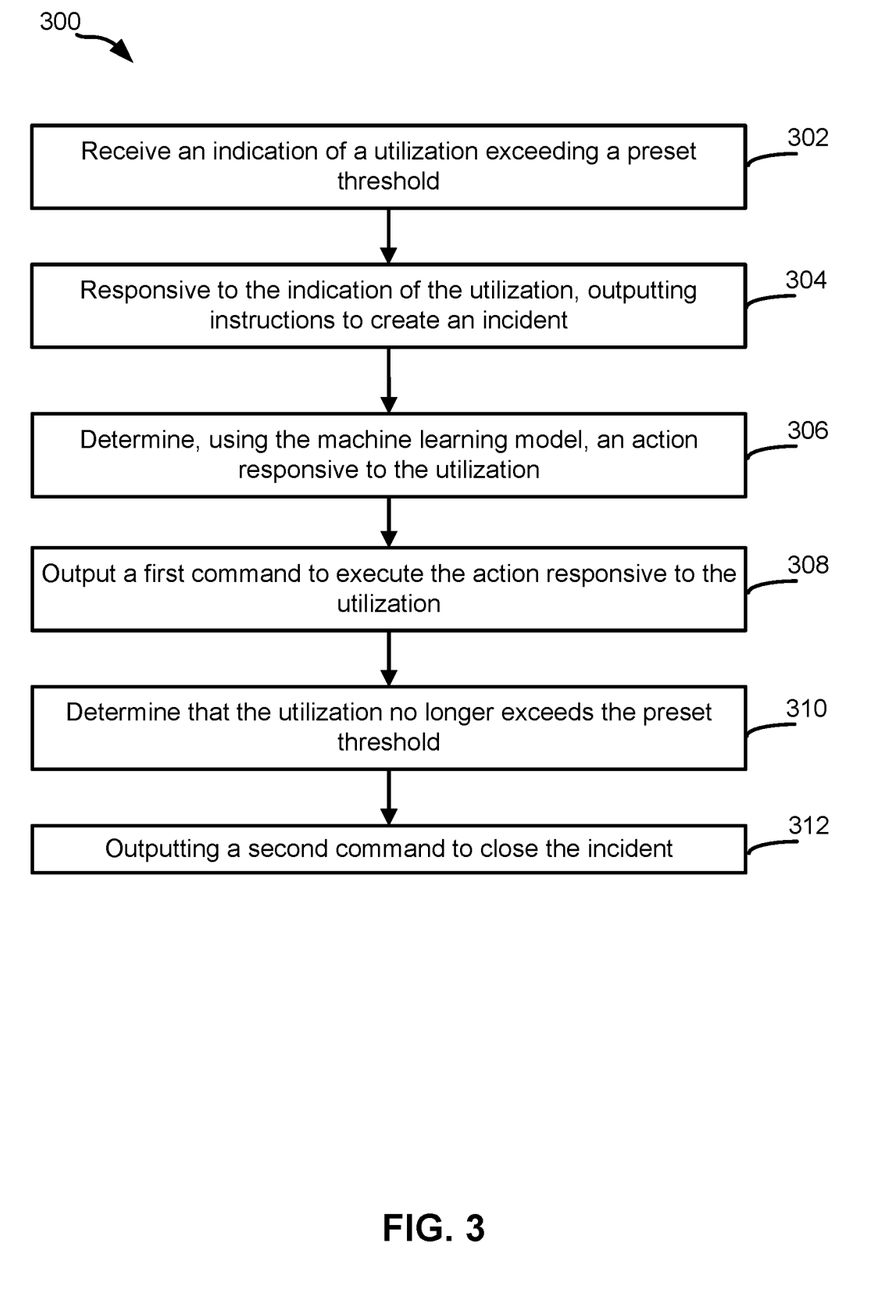
FIG. 3 is a flowchart of a process for managing computing resources using artificial intelligence and machine-learning tools according to one aspect of the present disclosure.

FIG. 3 depicts a flowchart of a process 300 for managing computing resources using artificial intelligence and machine-learning tools according to one aspect of the present disclosure. In some examples, the processing device 204 can implement the blocks shown in FIG. 3. The processing device 204 can implement the blocks according to program code received from other components, for example, from the remote execution module 110. Other examples of variations can include more blocks, fewer blocks, different blocks, or a different order of the blocks than is shown in FIG. 3. The blocks of FIG. 3 are discussed below with reference to the components discussed above in relation to FIGS. 1 and 2.

At block 302, the processing device 204 can receive an indication of a utilization exceeding a preset threshold. For example, the processing device 204 may execute program code to monitor components constituting a server 112. The monitoring may detect a utilization condition that includes a utilization exceeding a preset threshold. The utilization may include utilization of system 100 resources like disk space, memory, CPU resources, database memory allocations, JVM memory allocations, or other resources that may be managed according to the methods of the present disclosure. In another example, the processing device 204 may receive an error or warning from program code indicating a utilization condition. For example, a web application that relies on a database may return an error code to a user when a database write fails due to lack of disk space. The processing device 204 may receive the error in the form of a message, exception, log, or other suitable mechanism for communicating the utilization condition.

In block 304, the processing device 204 may, responsive to the indication of the utilization, output instructions to create an incident. The incident may have a severity level corresponding to the extent to which the preset threshold was exceeded. For example, if disk space consumption greater than 90% is detected by a monitoring system, the processing device may create a "P4" incident. P4 may correspond to the highest level of severity, which may result in application failure if not corrected. Other incident numbering schemes may be used in addition to this one. For example, in some incident numbering schemes, P1 corresponds to the highest level of severity. The incident may alert server engineers that a resource overutilization condition exists, and that corrective action is to be taken. The corrective action may be manual intervention by server engineers, or it may be automatic action by a machine-learning model 106 in accordance with the present disclosure.

In block 306, the processing device 204 may determine, using the machine-learning model 106, an action responsive to the utilization. The action may depend on the nature of the utilization. For example, when the utilization condition corresponds to a low disk space condition, the action may take the form of moving or deleting files or data. But the machine-learning model 106 is not limited by these actions and may determine any action in accordance with the training data 130 or other data used for training. The machine-learning model 106 may include a classification model implemented by a neural network or a clustering algorithm, among other possibilities. For example, the machine-learning model 106 may include naïve classifiers, neural networks, linear regressions, support vector machines, decision trees, or other suitable algorithms. The machine-learning model 106 may include other forms of artificial intelligence technologies including deep learning, natural language processing, expert systems, inference engines, or knowledge bases, among others. Determining the action may include generating one or more commands or identifying one or more scripts 108 configured to cause the correction of the utilization condition, or both.

The machine-learning model 106 may be generated by a processing device 204 accessing from a memory 206 training data 130 comprising a first plurality of commands, the first plurality of commands manually generated in response to the utilization exceeding the preset threshold. For example, prior to the training of the machine-learning model 106, responses to utilization conditions may include manual actions of server engineers. Those actions may be determined by the server engineers according to a variety of criteria and may be documented by, For example, a ticketing system. In some examples, the documentation may include machine-readable descriptions of the utilization conditions, the action taken in response to the utilization condition, and the resulting system 100 response. In some examples, the documentation may be human-readable and the machine-learning model 106 may include a natural language processing algorithm to interpret the human-readable documentation. The documentation of manual responses may include additional data that may be used by the machine-learning model during training. For example, the documentation may include dates and times of utilization condition, application data, response time, and any other data that may be input to the machine-learning model 106 according to a machine-learning algorithm.

The processing device 204 may receive a second plurality of commands, the second plurality of commands generated by the machine-learning model 106 in response to the utilization exceeding the preset threshold. The second plurality of commands may include feedback (i.e., online training) from the operating of the machine-learning model 106. In other words, the machine-learning model 106 may use the results of the action determined in response to a utilization condition as input to further train the machine-learning model 106. The actions along with the results may be labeled examples that can be used for supervised online training. A labeled example may be one that is classified. For example, the machine-learning model 106 may, in response to a low disk space condition, determine an action including deleting one or more files. The action may then reduce disk space utilization by a particular amount, which can serve as a labeled example for the machine-learning model 106. In this example, the label is the amount by which disk space utilization was reduced by the determined action.

The processing device 204 may train the machine-learning model 106 using a machine-learning algorithm using the training data 130 and the second plurality of commands. The machine-learning algorithm may include, for example, classifying labeled examples using a neural network or clustering unlabeled examples using a clustering algorithm according to a similarity measure. Any other suitable machine-learning algorithm may be used including artificial intelligence technologies such as deep learning, natural language processing, expert systems, inference engines, or knowledge bases. Other sources of training data may be used in addition to the two examples given here. For example, the machine-learning model 106 may be trained using a test system 134. The test system 134 may mirror the operating of the system 100. For example, the test system 134 may include filesystems or databases that are populated according to the populating of the corresponding components in the system 100. The test system 134 may include a portion or subset of the operations performed on the system 100. For example, a designated percentage of files written to the filesystems and database of the system 100 may be written to the test system, to make the test system 134 cost effective. The machine-learning model 106 may determine actions to correct utilization conditions on the test system 134, which may then execute commands to perform the actions. The machine-learning model 106 can use the result of executing the commands as labeled examples for supervised training. The test system 134 may include the benefit of lower risk since the actions take on the test system 134 may not affect the system 100.

In block 308, the processing device 204 may output a first command to execute the action responsive to the utilization. The action may include commands, scripts, or a combination thereof. The processing device 204 may cause the executing of the commands and/or scripts making up the action determined by the machine-learning model 106. In some examples, the machine-learning model 106 may output the command to cause the executing of the action it has determined.

In block 310, the processing device 204 may determine that the utilization no longer exceeds the preset threshold. For example, the processing device 204 may use a monitoring system to detect that disk space utilization has fallen below 90% or some other preset threshold. In some examples, the processing device 204 may run one or more commands or run one or more scripts 108 to make the determination.

In block 312, the processing device 204 may output a second command to close the incident. This may alert server engineers that the utilization condition no longer exists, and that no manual or automatic intervention is used. The second command may include instructions to record the action taken in response to the utilization. The recorded action may be used for online or feedback training of the machine-learning model 106.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computer-implemented method, comprising:
receiving an indication of a utilization exceeding a preset threshold;
responsive to the indication of the utilization, outputting instructions to create an incident;
determining, using a machine-learning model, an action responsive to the utilization;
outputting a first command to execute the action responsive to the utilization;
determining that the utilization no longer exceeds the preset threshold; and
outputting a second command to close the incident.

2. The method of claim 1, wherein the action responsive to the utilization is a first action, and further comprising:
determining, using the machine-learning model, a forecasted utilization exceeding the preset threshold;
determining, using the machine-learning model, a second action responsive to the forecasted utilization; and
outputting a third command to execute the second action responsive to the forecasted utilization.

3. The method of claim 1, wherein:
the utilization corresponds to disk space;
the machine-learning model comprising a clustering algorithm; and
determining, using the machine-learning model, the action responsive to the utilization comprises:
identifying a candidate file for deletion;
determining a similarity measure for each candidate using a property of the candidate file;
clustering, using the machine-learning model, the candidate file according to the similarity measure into a cluster; and
identifying a candidate cluster for deletion.

4. The method of claim 1, wherein the utilization corresponds to disk space, and wherein the action responsive to the utilization comprises:
moving a file to a cache, wherein the file is a cached file;
annotating the cached file with a timestamp;
annotating the cached file with a reason;

determining whether the timestamp of the cached file exceeds a cache lifetime; and responsive to determining that the timestamp of the cached file exceeds the cache lifetime, deleting the cached file.

5. The method of claim 1, wherein:

the utilization corresponds to disk space; and the action responsive to the utilization is a first action, and further comprising:

identifying a first portion of the utilization corresponding to a first application;

identifying a second portion of the utilization corresponding to a second application;

determining, using the machine-learning model, a second action responsive to the first portion, wherein the second action responsive to the first portion is based on first training data associated with the first application;

determining, using the machine-learning model, a third action responsive to the second portion, wherein the third action responsive to the second portion is based on second training data associated with the second application;

outputting a third command to execute the second action responsive to the first portion; and outputting a fourth command to execute the third action responsive to the second portion.

6. The method of claim 1, wherein the utilization corresponds to shared processor resources, and wherein the action responsive to the utilization comprises:

determining, using the machine-learning model, a reallocation of the shared processor resources;

reallocating the shared processor resources, according to the reallocation; and subsequent to reallocating the shared processor resources, outputting, to a program, a reallocation message to cause the program to utilize the shared processor resources, wherein the program is a consumer of the shared processor resources.

7. The method of claim 1, wherein the utilization corresponds to a shared memory, and wherein the action responsive to the utilization comprises:

determining, using the machine-learning model, a reallocation of the shared memory;

reallocating the shared memory, according to the reallocation; and subsequent to reallocating the shared memory, outputting, to a program, a reallocation message to cause the program to utilize the shared memory, wherein the program is a consumer of the shared memory.

8. A system comprising:

a processing device; and a memory device that includes instructions executable by the processing device for causing the processing device to perform operations comprising:

generate a machine-learning model, comprising:

accessing, from the memory device, training data comprising:

a first plurality of commands, the first plurality of commands manually generated in response to a utilization exceeding a preset threshold; and a first plurality of conditions, including a date the utilization exceeded the preset threshold and a time the utilization exceeded the preset threshold;

receiving a second plurality of commands, the second plurality of commands generated by the machine-learning model in response to the utilization exceeding the preset threshold; and training the machine-learning model using a machine-learning algorithm using:

the training data; and the second plurality of commands;

receive an indication of the utilization exceeding the preset threshold;

determine, using the machine-learning model, an action responsive to the utilization; and output a command to execute the action responsive to the utilization.

9. The system of claim 8, wherein the command to execute the action responsive to the utilization is a first command, and further comprising operations:

responsive to the indication of the utilization, output instructions to create an incident;

determine that the utilization no longer exceeds the preset threshold; and outputting a second command to close the incident.

10. The system of claim 8, wherein:

the command to execute the action responsive to the utilization is a first command; and the action responsive to the utilization is a first action, and further comprising operations:

determine, using the machine-learning model, a forecasted utilization exceeding the preset threshold;

determine, using the machine-learning model, a second action responsive to the forecasted utilization; and output a second command to execute the second action responsive to the forecasted utilization.

11. The system of claim 8, wherein:

the utilization corresponds to disk space;

the machine-learning model comprising a clustering algorithm; and determining, using the machine-learning model, the action responsive to the utilization comprises:

identifying a candidate file for deletion;

determining a similarity measure for each candidate using a property of the candidate file;

clustering, using the machine-learning model, the candidate file according to the similarity measure into a cluster; and identifying a candidate cluster for deletion.

12. The system of claim 8, wherein the utilization corresponds to disk space, and wherein the action responsive to the utilization comprises:

moving a file to a cache, wherein the file is a cached file;

annotating the cached file with a timestamp;

annotating the cached file with a reason;

determining whether the timestamp of the cached file exceeds a cache lifetime; and responsive to determining that the timestamp of the cached file exceeds the cache lifetime, deleting the cached file.

13. The system of claim 8, wherein:

the utilization corresponds to disk space the command to execute the action responsive to the utilization is a first command; and the action responsive to the utilization is a first action, and further comprising operations:

identify a first portion of the utilization corresponding to a first application;

identify a second portion of the utilization corresponding to a second application;

determine, using the machine-learning model, a second action responsive to the first portion, wherein the second action responsive to the first portion is based on first training data associated with the first application;

determine, using the machine-learning model, a third action responsive to the second portion, wherein the third action responsive to the second portion is based on second training data associated with the second application;

output a second command to execute the second action responsive to the first portion; and output a third command to execute the third action responsive to the second portion.

14. A non-transitory computer-readable medium comprising instructions that are executable by a processing device for causing the processing device to perform operations comprising:

generate a machine-learning model, comprising:
accessing, from a memory device, training data comprising:
a first plurality of commands, the first plurality of commands manually generated in response to a utilization exceeding a preset threshold; and
a first plurality of conditions, including a date the utilization exceeded the preset threshold and a time the utilization exceeded the preset threshold;
receiving a second plurality of commands, the second plurality of commands generated by the machine-learning model in response to the utilization exceeding the preset threshold; and
training the machine-learning model using a machine-learning algorithm using:
the training data; and
the second plurality of commands;
receive an indication of the utilization exceeding the preset threshold;
determine, using the machine-learning model, an action responsive to the utilization; and
output a command to execute the action responsive to the utilization.

15. The non-transitory computer-readable medium of claim 14, wherein the command to execute the action responsive to the utilization is a first command, and further comprising operations:

responsive to the indication of the utilization, output instructions to create an incident;

determine that the utilization no longer exceeds the preset threshold; and outputting a second command to close the incident.

16. The non-transitory computer-readable medium of claim 14, wherein:

the command to execute the action responsive to the utilization is a first command; and the action responsive to the utilization is a first action, and further comprising operations:

determine, using the machine-learning model, a forecasted utilization exceeding the preset threshold;

determine, using the machine-learning model, a second action responsive to the forecasted utilization; and output a second command to execute the second action responsive to the forecasted utilization.

17. The non-transitory computer-readable medium of claim 14, wherein:

the utilization corresponds to disk space;

the machine-learning model comprising a clustering algorithm; and the operation including determining, using the machine-learning model, the action responsive to the utilization comprises:

identifying a candidate file for deletion;

determining a similarity measure for each candidate using a property of the candidate file;

clustering, using the machine-learning model, the candidate file according to the similarity measure into a cluster; and identifying a candidate cluster for deletion.

18. The non-transitory computer-readable medium of claim 14, wherein the utilization corresponds to disk space, and wherein the action responsive to the utilization comprises:

moving a file to a cache, wherein the file is a cached file;

annotating the cached file with a timestamp;

annotating the cached file with a reason;

determining whether the timestamp of the cached file exceeds a cache lifetime; and responsive to determining that the timestamp of the cached file exceeds the cache lifetime, deleting the cached file.

19. The non-transitory computer-readable medium of claim 14, wherein:

the utilization corresponds to disk space the command to execute the action responsive to the utilization is a first command; and the action responsive to the utilization is a first action, and further comprising operations:

identify a first portion of the utilization corresponding to a first application;

identify a second portion of the utilization corresponding to a second application;

determine, using the machine-learning model, a second action responsive to the first portion, wherein the second action responsive to the first portion is based on first training data associated with the first application;

determine, using the machine-learning model, a third action responsive to the second portion, wherein the third action responsive to the second portion is based on second training data associated with the second application;

output a second command to execute the second action responsive to the first portion; and output a third command to execute the third action responsive to the second portion.

20. The non-transitory computer-readable medium of claim 14, wherein the utilization corresponds to a shared memory, and wherein the action responsive to the utilization comprises:

determining, using the machine-learning model, a reallocation of the shared memory;

reallocating the shared memory, according to the reallocation; and outputting, to a program, a reallocation message to cause the program to utilize the reallocated shared memory, wherein the program are consumers of the shared memory.

\* \* \* \* \*